US010122400B2

(12) United States Patent
Tiller et al.

(10) Patent No.: US 10,122,400 B2
(45) Date of Patent: Nov. 6, 2018

(54) VENT BLADE DEVICE MOUNTING ASSEMBLY

(71) Applicant: Thru2Market Solutions (HK) Limited, Shatin (HK)

(72) Inventors: Robert Tiller, New South Wales (AU); Adam Hobbs, New South Wales (AU); Steve Hill, New South Wales (AU)

(73) Assignee: THRU2MARKET SOLUTIONS, Shatin (AU)

( * ) Notice: Subject to any disclaimer, the term of this patent is extended or adjusted under 35 U.S.C. 154(b) by 0 days.

(21) Appl. No.: 15/374,194

(22) Filed: Dec. 9, 2016

(65) Prior Publication Data
US 2017/0170858 A1    Jun. 15, 2017

(30) Foreign Application Priority Data

Dec. 10, 2015  (AU) ............................... 2015905113

(51) Int. Cl.
*B60R 11/02*    (2006.01)
*H04B 1/3877*    (2015.01)
*B60R 11/00*    (2006.01)

(52) U.S. Cl.
CPC ........ *H04B 1/3877* (2013.01); *B60R 11/0241* (2013.01); *B60R 2011/007* (2013.01); *B60R 2011/0008* (2013.01); *B60R 2011/0059* (2013.01)

(58) Field of Classification Search
CPC ..... B60R 2011/0008; B60R 2011/0059; B60R 11/0241; B60R 11/0258; B60R 11/007; Y10S 224/929; H04B 1/3877

USPC ................ 224/929, 483, 536, 558; D14/253; 248/229.12, 229.22, 228.3, 230.3, 231.41, 248/316.4, 229.14, 229.24, 228.5, 230.5, 248/231.61, 316.6

See application file for complete search history.

(56) References Cited

U.S. PATENT DOCUMENTS

| 3,533,590 | A | * | 10/1970 | Swire ................. A47G 23/0225 211/41.2 |
| 6,163,997 | A | * | 12/2000 | Deralas .................... A47G 1/06 40/593 |
| 7,712,720 | B1 | * | 5/2010 | Cheng .................... B60R 11/00 248/205.5 |
| D750,612 | S | * | 3/2016 | Chen ........................... D14/253 |
| 2011/0163143 | A1 | * | 7/2011 | Zanetti .................... B60R 11/02 224/567 |
| 2014/0054338 | A1 | * | 2/2014 | Casagrande ........... B60R 11/02 224/275 |

(Continued)

*Primary Examiner* — Scott McNurlen
(74) *Attorney, Agent, or Firm* — Wood, Phillips, Katz, Clark & Mortimer

(57) ABSTRACT

A vent blade device mounting assembly (20). The assembly (20) including a first body part (24), a static jaw (38), a movable jaw (34), a spring (32), a second body part (26) and a link means (30). The static jaw (38) extends from the first body part (24). The movable jaw (34) extends from the first body part (24). The spring (32) biases the movable jaw (34) towards the static jaw (38). The second body part (26) telescopically mounts to the first body part (24). The link means (30) is between the second body part (26) and the movable jaw (34). Depression of the second body (26) part inwardly into the first body part (24) drives the link means (30) which in turn drives the movable jaw (34) away from the static jaw (38) against the bias of the spring (32).

20 Claims, 3 Drawing Sheets

(56) References Cited

U.S. PATENT DOCUMENTS

| | | | |
|---|---|---|---|
| 2014/0103087 A1* | 4/2014 | Fan | B60R 11/02 224/544 |
| 2016/0082893 A1* | 3/2016 | Ormsbee | B60R 11/0241 224/558 |
| 2017/0170860 A1* | 6/2017 | Tiller | H04B 1/3883 |

* cited by examiner

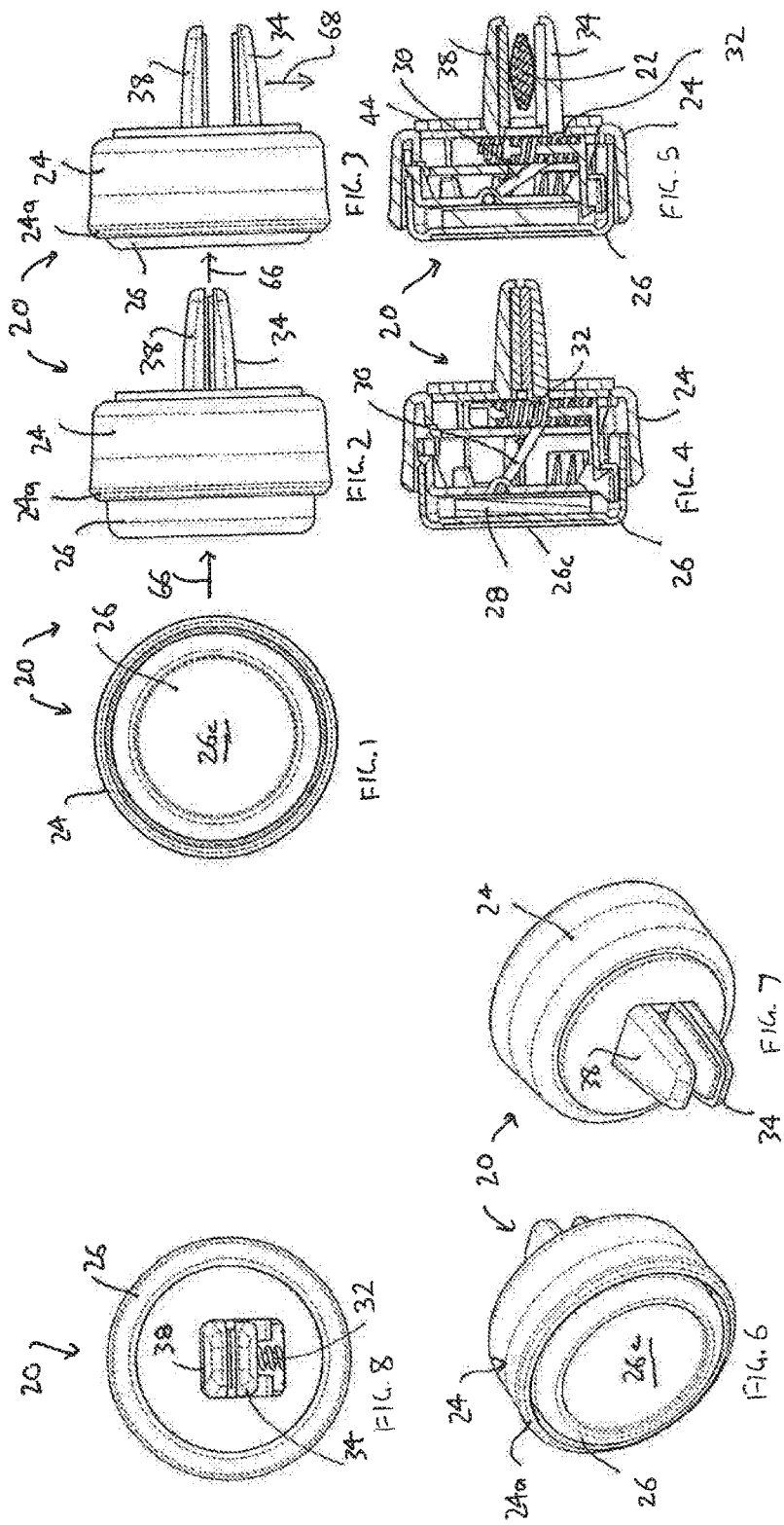

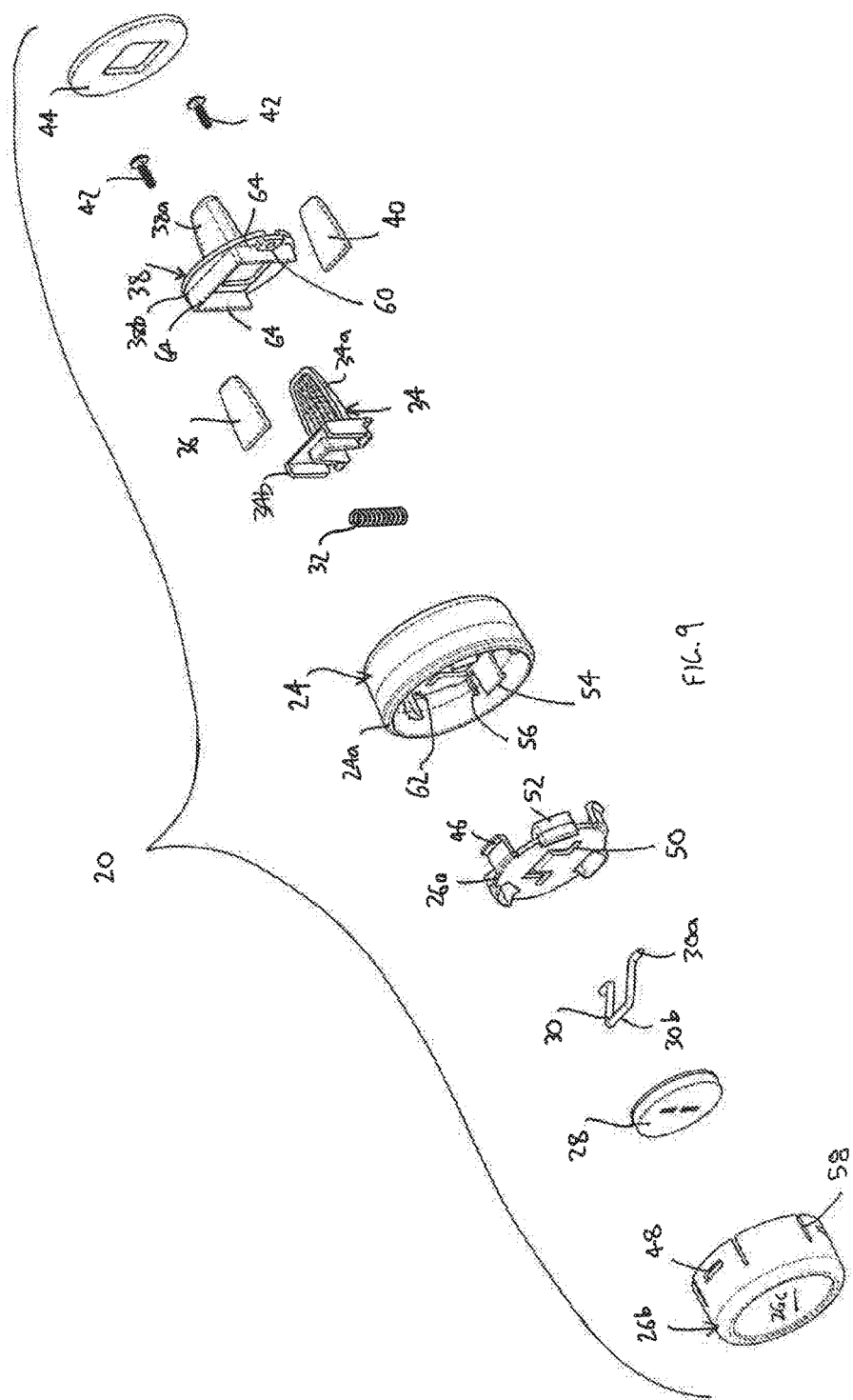

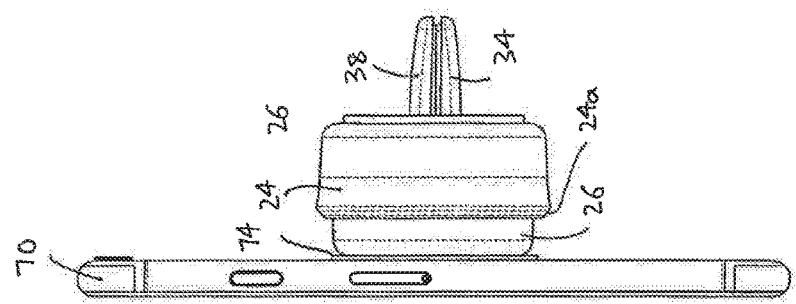
FIG. 12
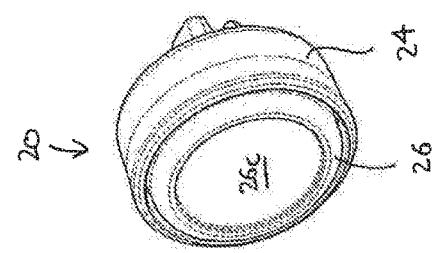
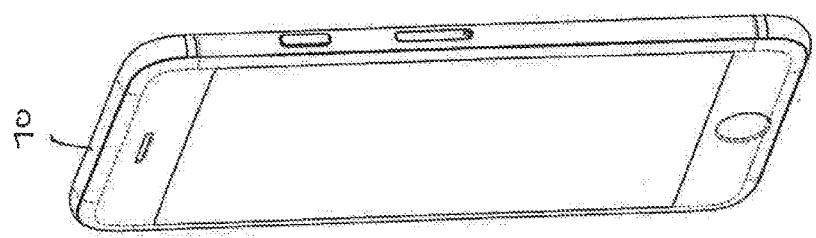
FIG. 11
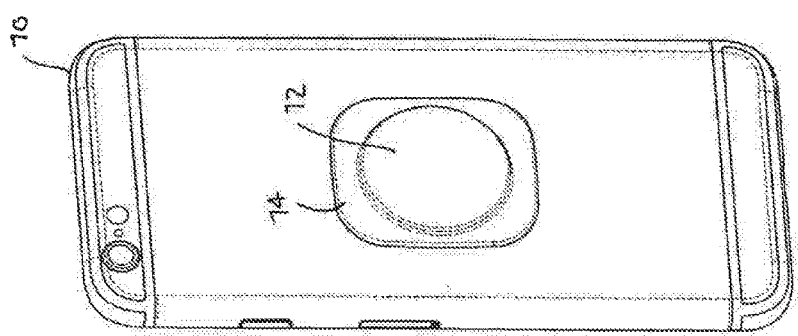
FIG. 10

VENT BLADE DEVICE MOUNTING ASSEMBLY

FIELD OF THE INVENTION

The present invention relates to a vent blade device mounting assembly.

The invention has been primarily developed for use in mounting a communications device, such as a smartphone (e.g. iPhone), to a blade of a vehicle's vent, which form part of a vehicle's an air conditioning or heating system, and will be described hereinafter with reference to this application. However, the invention is also applicable for use with other communication devices, such as tablets (e.g. iPads), and other portable electronic devices with a sufficiently sized flat mounting surface and weighing less than about 380 grams.

BACKGROUND OF THE INVENTION

It is known to mount a wide range of devices, including mobile telephones and air fresheners, to the blade of a vehicle's vent. There are three main known mounting types: friction; hook; and grip.

A known friction mount uses a fixed pair of jaws with a small amount of inherent flexibility, which are each positioned either side of the vent blade. The disadvantage of a friction mount is it provides only a relatively low amount of grip, which can lead to the mount slipping off the blade. The action of pushing the friction mount into engagement with the blade can also damage the blade if the pushing force is too high.

A known hook mount uses a static, hook-shaped, part which extends around the rear edge of the vent blade and a movable, hook-shaped, part which engages the front edge of the vent blade. The movable part is spring biased towards the rear part to clamp the blade therebetween. The disadvantage of a hook mount is it is difficult to install and remove it to and from the blade. In particular, the blade is often damaged if removal is attempted with the hook-shaped parts not fully disengaged.

A known grip mount uses a static jaw and a movable jaw, each positioned against an upper or lower surface of the blade. The movable jaw is spring biased towards the static jaw to damp the vent blade therebetween. Typically, a known grip mount has some parts which must be squeezed together in a vertical direction to open the jaws, whilst the mount is being positioned relative to the blade in a horizontal direction. The disadvantage of such a grip mount is it is difficult to install and remove it to and from the blade, as the (vertical) action required to open the jaws is separate to the (horizontal) action of positioning the mount, but these action must be performed simultaneously.

OBJECT OF THE INVENTION

It is an object of the present invention to substantially overcome or at least ameliorate one or more of the above disadvantages.

SUMMARY OF INVENTION

Accordingly, in a first aspect, the present invention provides a vent blade device mounting assembly, the assembly including:
a first body part;
a static jaw extending from the first body part;
a movable jaw extending from the first body part;
a spring biasing the movable jaw towards the static jaw;
a second body part telescopically mounted to the first body part; and
a link means between the second body part and the movable jaw,
wherein depression of the second body part inwardly into the first body part drives the link means which in turn drives the movable jaw away from the static jaw against the bias of the spring.

Preferably, the assembly is positionable with the static jaw and the movable jaw either side of a vent blade respectively by advancing the jaws over the vent blade in an installation direction, and movement of the second body part relative to the first body part in the installation direction drives the movable jaw away from the static jaw against the bias of the spring.

In a second aspect, the present invention provides a vent blade device mounting assembly, the assembly including:
a first body part;
a static jaw extending from the first body part;
a movable jaw extending from the first body part;
a spring biasing the movable jaw towards the static jaw;
a second body part movably mounted to the first body part; and
a link means between the second body part and the movable jaw,
wherein the assembly is positionable with the static jaw and the movable jaw either side of a vent blade respectively by advancing the jaws over the vent blade in an installation direction, and movement of the second body part inwardly relative to the first body part in the installation direction drives the link means which in turn drives the movable jaw away from the static jaw against the bias of the spring.

Preferably, the second body part is telescopically mounted to the first body part.

The second body part preferably includes a magnetic region for magnetic engagement with a magnetically attractable part affixed to, or forming part of, a device, most preferably a communications device. The magnetically attractable part preferably includes a male protruding region and the second body part preferably includes a recessed female magnetic region adapted to receive and locate the male protruding region therein The strength of magnetic engagement between the second body part and the magnetically attractable part is less than the strength of clamping engagement between the jaws and the vent, such that during the application of a sufficiently large separating force between the magnetically attractable part and the vent, the magnetic engagement between the second body part and the magnetically attractable part will release preferentially ahead of the engagement between the jaws and the vent.

The first body part and the second body part are preferably cylindrical.

The static jaw is preferably fixed to the first body part. The movable jaw is preferably slidably mounted to the first body part.

The link means preferably has a first end, abutting the second body part, and a second end, abutting the movable jaw.

The second body part preferably includes an inner part and an outer part, with a magnet sandwiched therebetween.

BRIEF DESCRIPTION OF THE DRAWINGS

A preferred embodiment of the present invention will now be described, by way of an example only, with reference to the accompanying drawings, in which:

FIG. 1 is a front view of a first embodiment of a vent blade device mounting assembly;

FIG. 2 is a side view of the assembly shown in FIG. 1, with closed jaws;

FIG. 3 is a side view of the assembly shown in FIG. 1, with open jaws;

FIG. 4 is a cross sectional side view of the assembly shown in FIG. 2;

FIG. 5 is a cross sectional side view of the assembly shown in FIG. 3;

FIG. 6 is a front perspective view of the assembly shown in FIG. 3;

FIG. 7 is a rear perspective view of the assembly shown in FIG. 3;

FIG. 8 is a rear view of the assembly shown in FIG. 2;

FIG. 9 is an exploded perspective view of the assembly shown in FIG. 1;

FIG. 10 is a perspective view of a smartphone with a shim mounted thereon;

FIG. 11 shows the smartphone in FIG. 10 positioned for engagement with the assembly shown in FIG. 1; and FIG. 12 is a side view of the components shown in FIG. 11 in an engaged configuration.

DETAILED DESCRIPTION OF THE PREFERRED EMBODIMENTS

FIGS. 1 to 9 show an assembly 20 used in mourning a device, such as a smartphone, to a blade 22 (see FIG. 5) of a vehicle's vent.

With reference to FIG. 9, the assembly 20 include a cylindrical first body part 24, a cylindrical second body part 26 (formed from an inner part 26a and an outer part 26b), a magnet 28, a link 30, a spring 32, a moveable jaw 34 (with a pad 36), a static jaw 38 (with a pad 40), a pair of screws 42 and an end pad 44.

The first body part 24, the inner body part 26a, the outer body part 26b, the moveable jaw 34 and the static jaw 38 are injection moulded from plastic material, such as PC ABS. The magnet 28 is of the polymagnet type, as generally described in U.S. Pat. No. 7,800,471. The link 30 and the spring 32 are manufactured from stainless steel. The pads 36, 40 and 44 are manufactured from rubber, and aid in the gripping of the jaws 34, 38 to the blade 22 and avoiding damage of same.

The inner body part 26a includes three barbs 46 which snap engage with slots 48 in the outer body part 26b to fix the inner body part 26a to the outer body part 26b. The magnet 28 is located between the inner body part 26a and the outer body part 26b and is sandwiched therein by the engagement of the barbs 46 with the slots 48. The inner body part 26a has an exterior, female, recessed region 26c adjacent to the magnet 28. The inner body part 26a also includes an opening 50 through which the link 30 can pass. The inner part 26a also includes three flanges 52 which snap engage with elongate barbs 54 provided on the first body part 24, to slidably (telescopically) mount the first body part 24 to the second body part 26. The first body part 24 also includes inwardly facing raised guides 56, which are received within slots 58 provided in the outer body part 26b. The guides 56 and the slots 58 together guide the relative (telescopic style) movement of the second body part 26 relative the first body part 24 in an axial direction, and prevent tilting or jamming during that movement.

The link 30 has an inner end 30a which abuts against the first body part 24 and an outer end 30b which abuts against the second body part 26.

The movable jaw 34 includes an outer part 34a and an inner part 34b. The pad 36 is mounted to the outer part 34a. The static jaw 38 includes an outer part 38a and an inner part 38b. The pad 40 is mounted to the outer part 38b. The inner part 38b is fixed to the first body part 24 by the screws 42 passing through holes 60 and into holes 62. The inner part 38a includes a rectangular recess defined by three walls 64, within which is slidably received the inner part 34b of the moveable jaw 34. The spring 32 biases the moveable jaw 34 to slide within this recess towards the static jaw 38.

The use of the assembly 20 described above will now be described, with reference to FIGS. 2 to 5.

FIGS. 2 and 4 show the assembly 20 with the jaws 34, 38 closed under the influence of the spring 32. To move the jaws 34, 38 to the open position shown in FIGS. 3 and 5, the second body part 26 is pressed inwardly, in the direction of arrow 66, relative to the first body part 24. This the relative movement of the second body part 26 inwardly relative to the first part 24 drives the link 30 inwardly through the first body part 26, which in turn causes the link to drive the moveable jaw 34 away from the static jaw 38 against the bias of the spring 32, in the direction of arrow 68. As shown in FIG. 5, the open jaws 34, 38 can then be positioned either side of the vent blade 52. When pressure is released from the second part 26 (relative to the first part 24), the spring 32 drives the moveable jaw 34 back towards the fixed jaw 38, thereby clamping the assembly 20 to the blade 22. This process is repeated when it is desired to open the jaws 34, 38 and remove the assembly 20 from the blade 22.

It is envisaged that a user will depress the second part 26 with a thumb whilst holding the first part 24 with their index finger and ring finger. To assist in this gripping, the first part 24 includes an external raised lip 24a.

FIG. 10 shows a smartphone 70 to which has been adhered a thin cylindrical disc or shim 72 that is covered by a thin adhesive sheet 74. The outer diameter of the shim 72 is only slightly less than the inner diameter of the recessed female region 26c on the second part 26.

FIG. 11 shows the smartphone 70 being positioned for engagement with the assembly 20. FIG. 12 shows the smartphone 70 mounted to the assembly 20 due to the magnetic attracting force between the magnet 28 and the shim 72. The magnetic attracting force (of approximately 35 Newtons) locates the smartphone 70 relative to the assembly 20 in the longitudinal direction. The engagement of the protruding shim 72 within the recessed magnetic region 26c locates the smartphone 70 laterally with respect to the assembly 20, whilst still allowing the smartphone 70 to be manually pivoted with respect to the assembly 20 without losing the engagement therebetween.

The magnetic attraction between the smartphone 70 and the assembly 20 is less than the clamping engagement between the assembly 20 and the vent blade 22. The smartphone 70 can thus be easily removed from the assembly 20, whilst leaving the assembly 20 engaged with the vent blade 22 for future use.

The assembly described above has numerous advantages, Firstly, the jaws provide superior gripping when compared to friction mounts or hook mounts. Secondly, the use of the assembly is simpler and more intuitive than known grip mounts, as the horizontal pressing action required to open the jaws is the same as the horizontal movement required to position the assembly relative to the vent blade, bearing in mind that these action must be performed simultaneously. Put another way, relative to the user, the (forward) direction of the depression of the second part relative to the first part is the same as the (forward) direction the assembly must be moved to position it relative to the vent blade.

Although the invention has been described with reference to the preferred embodiments, it will be appreciated by person skilled in the art that the invention can be embodied in many other forms. For example, the magnet can be replaced by an adhesive or a clamp. Also, the shim can be incorporated into the original construction of the smartphone or to a case or cover for same. Further, the assembly can be used to mount devices other than communication devices.

The invention claimed is:

1. A vent blade device mounting assembly, the assembly including:
   a first body part;
   a static jaw extending from the first body part;
   a movable jaw extending from the first body part;
   a spring biasing the movable jaw towards the static jaw;
   a second body part telescopically mounted to the first body part; and
   a link means between the second body part and the movable jaw,
   wherein depression of the second body part inwardly into the first body part in a direction in line with an instalment direction of the assembly drives the link means which in turn drives the movable jaw away from the static jaw against the bias of the spring.

2. The vent blade device mounting assembly as claimed in claim 1, wherein the first body part and the second body part are cylindrical.

3. The vent blade device mounting assembly as claimed in claim 1, wherein the static jaw is fixed to the first body part.

4. The vent blade device mounting assembly as claimed in claim 1, wherein the movable jaw is slidably mounted to the first body part.

5. The vent blade device mounting assembly as claimed in claim 1, wherein the link means has a first end, abutting the second body part, and a second end, abutting the movable jaw.

6. A vent blade device mounting assembly, the assembly including:
   a first body part;
   a static jaw extending from the first body part;
   a movable jaw extending from the first body part;
   a spring biasing the movable jaw towards the static jaw;
   a second body part telescopically mounted to the first body part; and
   a link means between the second body part and the movable jaw,
   wherein depression of the second body part inwardly into the first body part drives the link means which in turn drives the movable jaw away from the static jaw against the bias of the spring, wherein the assembly is positionable with the static jaw and the movable jaw either side of a vent blade respectively by advancing the jaws over the vent blade in an installation direction, and movement of the second body part relative to the first body part in the installation direction drives the movable jaw away from the static jaw against the bias of the spring.

7. A vent blade device mounting assembly, the assembly including:
   a first body part;
   a static jaw extending from the first body part;
   a movable jaw extending from the first body part;
   a spring biasing the movable jaw towards the static jaw;
   a second body part telescopic* mounted to the first body part; and
   a link means between the second body part and the, movable jaw,
   wherein depression of the second body part inwardly into the first body part drives the link means which in turn drives the movable jaw away from the static jaw against the bias of the spring, wherein the second body part includes a magnetic region for magnetic engagement with a magnetically attractable part affixed to, or forming part of, a device.

8. The vent blade device mounting assembly as claimed in claim 7, wherein the magnetically attractable part includes a male protruding region and the second body part includes a recessed female magnetic region adapted to receive and locate the male protruding region therein.

9. The vent blade device mounting assembly as claimed in claim 8, wherein the strength of magnetic engagement between the second body part and the magnetically attractable part is less than the strength of clamping engagement between the jaws and the vent, such that during the application of a sufficiently large separating force between the magnetically attractable part and the vent, the magnetic engagement between the second body part and the magnetically attractable part will release preferentially ahead of the engagement between the jaws and the vent.

10. A vent blade device mounting assembly, the assembly including;
    a first body part;
    a static jaw extending from the first body part;
    a movable jaw extending from the first body part;
    a spring biasing the movable jaw towards the static jaw;
    a second body part telescopically mounted to the first body part; and
    a link means between, the second body part and the movable jaw,
    wherein depression of the second body part inwardly into the first body pat drives the link means which in turn drives the movable jaw away from the static jaw against the bias of the spring, wherein the second body part includes an inner part and an outer part, with a magnet sandwiched therebetween.

11. A vent blade device mounting assembly, the assembly including:
    a first body part;
    a static jaw extending from the first body part;
    a movable jaw extending from the first body part;
    a spring biasing the movable jaw towards the static jaw;
    a second body part movably mounted to the first body part; and
    a link means between the second body part and the movable jaw,
    wherein the assembly is positionable with the static jaw and the movable jaw either side of a vent blade respectively by advancing the jaws over the vent blade in an installation direction, and movement of the second body part inwardly relative to the first body part in the installation direction drives the link means which in turn drives the movable jaw away from the static jaw against the bias of the spring.

12. The vent blade device mounting assembly as claimed in claim 11, wherein the second body part is telescopically mounted to the first body part.

13. The vent blade device mounting assembly as claimed in claim 11, wherein the second body part includes a magnetic region for magnetic engagement with a magnetically attractable part affixed to, or forming part of, a device.

14. The vent blade device mounting assembly as claimed in claim 13, wherein the magnetically attractable part includes a male protruding region and the second body part includes a recessed female magnetic region adapted to receive and locate the male protruding region therein.

15. The vent blade device mounting assembly as claimed in claim 14, wherein the strength of magnetic engagement between the second body part and the magnetically attractable part is less than the strength of clamping engagement between the jaws and the vent, such that during the application of a sufficiently large separating force between the magnetically attractable part and the vent, the magnetic engagement between the second body part and the magnetically attractable part will release preferentially ahead of the engagement between the jaws and the vent.

16. The vent blade device mounting assembly as claimed in claim 11, wherein the first body part and the second body part are cylindrical.

17. The vent blade device mounting assembly as claimed in claim 11, wherein the static jaw is fixed to the first body part.

18. The vent blade device mounting assembly as claimed in claim 11, wherein the movable jaw is slidably mounted to the first body part.

19. The vent blade device mounting assembly as claimed in claim 11, wherein the link means has a first end, abutting the second body part, and a second end, abutting the movable jaw.

20. The vent blade device mounting assembly as claimed in claim 11, wherein the second body part includes an inner part and an outer part, with a magnet sandwiched therebetween.

\* \* \* \* \*